United States Patent
Schroer et al.

(10) Patent No.: US 10,199,787 B2
(45) Date of Patent: Feb. 5, 2019

(54) ARRANGEMENT FOR ELECTRICAL LINES MOUNTED IN A MOTOR VEHICLE

(71) Applicant: NEXANS, Paris (FR)

(72) Inventors: Frank Schroer, Weiden (DE); Helmut Rebhan, Weiden (DE); Alexander Steinert, Floss (DE); Markus Wall, Floss (DE)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 14/790,184

(22) Filed: Jul. 2, 2015

(65) Prior Publication Data
US 2016/0049762 A1    Feb. 18, 2016

(30) Foreign Application Priority Data
Aug. 14, 2014   (EP) .................................. 14 306 297

(51) Int. Cl.
*H01R 35/02*     (2006.01)
*B60R 16/027*    (2006.01)

(52) U.S. Cl.
CPC ......... *H01R 35/025* (2013.01); *B60R 16/027* (2013.01)

(58) Field of Classification Search
CPC ............................ H01R 35/025; B60R 16/027
USPC ..................... 439/13, 15, 162, 164
See application file for complete search history.

(56) References Cited

U.S. PATENT DOCUMENTS

| | | | | |
|---|---|---|---|---|
| 4,429,588 A | * | 2/1984 | Emundts ................ | B60K 37/02 280/775 |
| 4,604,912 A | * | 8/1986 | Sugita .................... | B60K 35/00 200/61.54 |
| 5,046,951 A | * | 9/1991 | Suzuki .................. | B60R 16/027 439/15 |
| 5,072,628 A | * | 12/1991 | Oki ........................ | B60K 35/00 74/484 R |
| 5,238,420 A | * | 8/1993 | Miyahara .............. | B60R 16/027 439/15 |

(Continued)

FOREIGN PATENT DOCUMENTS

| | | |
|---|---|---|
| GB | 2282013 | 3/1995 |
| GB | 2287140 | 9/1995 |
| WO | 0051844 | 9/2000 |

OTHER PUBLICATIONS

Search Report dated 2015.

*Primary Examiner* — Edwin A. Leon
*Assistant Examiner* — Oscar Jimenez
(74) *Attorney, Agent, or Firm* — Sofer & Haroun, LLP

(57) ABSTRACT

An arrangement for electrical lines is set forth which is mounted in a steering column switching module and/or in a steering wheel mounted on the module, equipped with its ends electrically conductively connected to one of the electrical components, which is fixedly mounted in the steering wheel switching module or in the steering wheel mounted thereon. At least two of the lines are connected with their other free ends to electrical contacts, which are arranged in at least one coupling body of insulation material in such a way that they are accessible on the plug-in side thereof. The coupling body is accessible from the outside connected with a plug-in side on or in the steering column switching module of the motor vehicle and, in the assembly position, an electrical line leading to the coupling body is connected through an electrical line leading to the onboard network.

2 Claims, 2 Drawing Sheets

(56) References Cited

U.S. PATENT DOCUMENTS

| | | | | |
|---|---|---|---|---|
| 5,246,377 A | * | 9/1993 | Kawahara | B60R 16/027 439/15 |
| 5,827,081 A | * | 10/1998 | Sakamaki | B60R 16/027 439/15 |
| 6,247,977 B1 | * | 6/2001 | Tanaka | B60R 16/027 439/492 |
| 6,390,838 B1 | * | 5/2002 | Kawamura | H01R 35/025 439/164 |
| 6,435,885 B2 | * | 8/2002 | Araki | H01R 35/025 439/164 |
| 6,501,033 B2 | * | 12/2002 | Pastwa | B60Q 1/1461 200/61.27 |
| 6,688,898 B2 | * | 2/2004 | Nisimoto | B60R 16/027 439/15 |
| 6,736,657 B2 | * | 5/2004 | Bonn | B60R 16/027 439/164 |
| 6,854,977 B2 | * | 2/2005 | DuRocher | H01R 13/6315 280/728.2 |
| 7,323,312 B2 | * | 1/2008 | Yoshiki | G01N 33/57407 435/4 |
| 7,425,143 B2 | * | 9/2008 | Mitsui | H01R 35/025 242/388 |
| 2002/0125061 A1 | * | 9/2002 | Kawamura | B60R 16/027 180/400 |
| 2002/0151192 A1 | | 10/2002 | Canuto et al. | |
| 2009/0317994 A1 | * | 12/2009 | Oishi | B62D 1/16 439/164 |

* cited by examiner

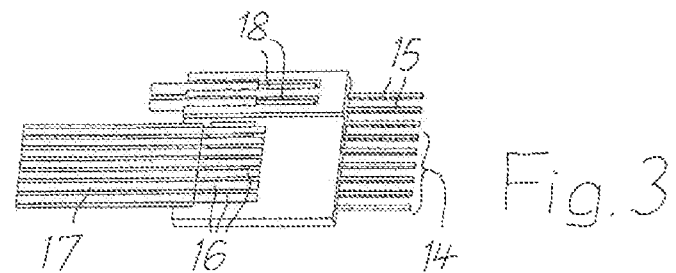
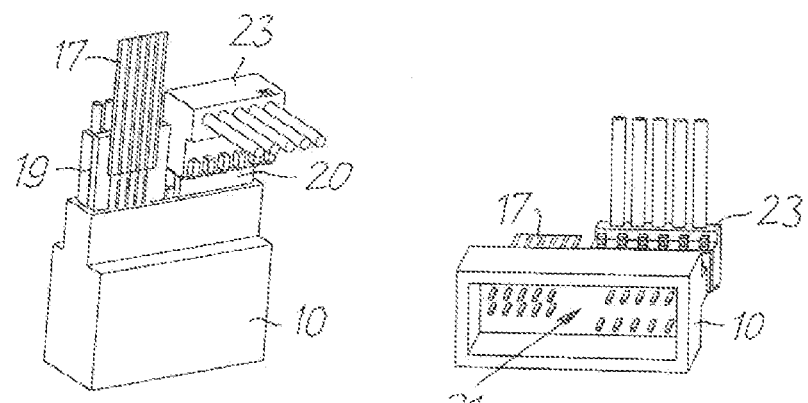
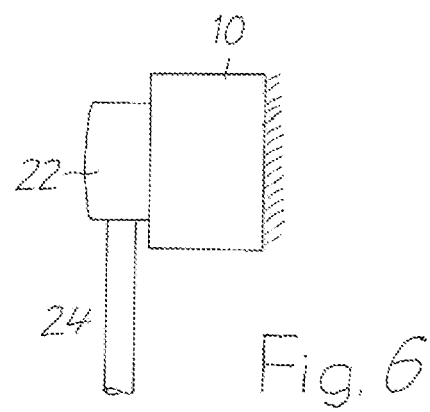

ARRANGEMENT FOR ELECTRICAL LINES MOUNTED IN A MOTOR VEHICLE

RELATED APPLICATION

This application claims the benefit of priority from European Patent Application No. 14 306 297.4, filed on Aug. 20, 2014, the entirety of which is incorporated by reference.

BACKGROUND

Field of the Invention

The invention relates an arrangement for electrical lines which are mounted in a steering column switching module and/or in a steering wheel placed on the module of a motor vehicle, equipped with an onboard network and which is electrically conductively connected to an electric component, which is mounted in the steering column switching module on the steering wheel.

Description of the Related Art

Such an arrangement is known and used worldwide. In addition to cable trees or cable sets, through which users of electrical current of a motor vehicle—in the following "vehicle" is called vehicle for short—are connected to a voltage source present in the vehicle, in modern vehicles an arrangement is provided as it is described at the outset. This arrangement has numerous electrical components such as, for example, keys or levers which are also called steering column switches. Levers with electrical components are, for example, a lever for actuating the windshield wiper, a lever for actuating the directional signal and a lever for automatically adjusting the steering wheel.

All structural components and all additional electrical components are connected to the onboard network of the vehicle through individual lines. Numerous functional keys for the most different functions are advantageously mounted in the steering wheel. For the electrical connection of the functional elements mounted in the steering wheel, a rotation transmitter called "air bag cassette" can be utilized as a rotation transmitter which has at least one electrical line to which the functional elements are connected. This line must also be connected to the onboard network of the vehicle. Such a rotation transmitter consists essentially of a stator mounted in the module of the vehicle and a rotor rotatably connected to the steering wheel about the axis of the same. Between stator and rotor is mounted at least one electrical line arranged in windings which carries out the rotation of the steering wheel without sliding contacts. EP 1 973 205 A1 describes different embodiments of rotary connector. The electrical connection of the structural components present in or on a module or in a steering wheel is complicated in today's technology.

OBJECTS AND SUMMARY

The invention is based on the object of constructing the above mentioned arrangement in such a way that any electrical components which may be present in the vehicle can be connected to the onboard network of the vehicle in a simpler manner.

In accordance with the invention, this object is met in that at least two of the lines are connected with their other free ends to electrical contacts which are arranged in at least one coupling body of insulating material in such a way that they are accessible for plugging an electrical plug-in element on the plug in side of the same, the coupling body is mounted with a plug-in side accessible from the outside or in the module of the vehicle, and on the coupling body in the assembly position thereof an electrical line leading to the onboard side of the vehicle is connected.

In this arrangement, at least two of the electrical lines contained in a module and/or in the steering wheel, which are with their first ends connected to electrical components which are present in the module or the steering wheel, connected to their other free ends with electrical contacts, which are arranged in at least one coupling body of insulation material in such a way that they are accessible on the one plug-in side thereof. They can then be connected by means of only one electrical line suitable for connecting the coupling body with the onboard network of the vehicle. Advantageously more than two, or as many as possible, of the lines connected to a module and/or existing in the steering wheel, are connected to contacts of a coupling body. In this connection, two or more coupling bodies can be used. The electrical connection of the electrical components or functional elements with the onboard network is significantly simplified in case of a larger number of lines.

For constructing the arrangement, the electrical lines of the individual conductors can initially advantageously be connected to suitable electrical contacts which are then inserted in openings or recesses of a prefabricated coupling body in such a way that they are accessible on its plug-in side for plugging in a plug-in element. The plug-in element mounted on an electrical line is preferably a bushing. However, it can also be a contact pin. The construction of such a plug-in element and the number of electrical conductors depend on the number and the structural configuration of the contacts of the coupling body, or the number of conductors connected to the coupling body.

BRIEF DESCRIPTION OF THE DRAWINGS

Embodiments of the subject matter of the invention are illustrated in the drawings. In the drawings:

FIG. 3 is an electrical contact element with connected lines.

FIGS. 4 and 5 show two different views of a coupling member.

FIG. 6 shows a coupling body and connected plug-in element.

DETAILED DESCRIPTION

In the arrangement according to the invention, the electrical conductors of at least two lines are connected to contacts of a coupling body. In a preferred embodiment, which will be described in the following, by way of prefabrication they can be equipped with the contacts which are subsequently arranged in recesses of the coupling body. However, the conductors can also be connected to contacts which are already mounted in the coupling body. This is true even if coupling bodies are used which contain two or more electrical contacts.

The ends of the contact, which protrude out of the coupling body on the plug-in side of the coupling body, can be constructed as pins or bushings. In adaptation to the shape of the contacts protruding out of the coupling body, the plug-in element is in that case either a busing or a plug-in member.

In the following description, the arrangement according to the invention is described as an arrangement with only one coupling body. Instead of the word "steering column switching module," the word "module" continues to be used.

Figure 1:
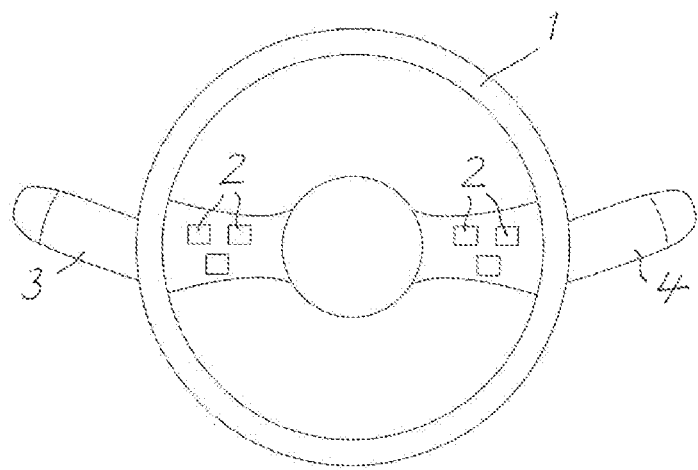
FIG. 1 is a schematic illustration of a top view of a steering wheel of a vehicle.

In FIG. 1, a steering wheel 1 is schematically illustrated which is equipped with, for example, six manually operated keys. The keys 2 may, for example, belong to a telephone unit, a loudspeaker with "louder"—or "lower," and to a so-called "tempomat." In addition, two levers 3 and 4 are indicated, which are covered by the steering wheel 1 and therefore not recognizable in FIG. 1, contain the electrical components. Connected to the keys 2 and the electrical components of the levers 3 and 4, the conductors of the electrical lines are connected in the finished mounted state to the onboard network of the vehicle.

Figure 2:
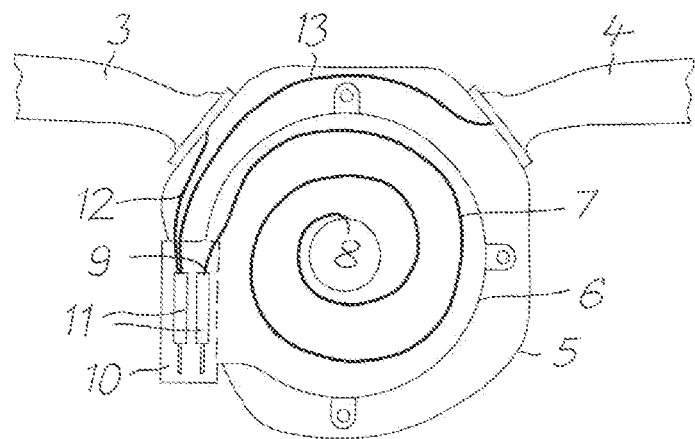
FIG. 2 also shows a schematic illustration of the interior of a module underneath the steering wheel.

FIG. 2 is a purely schematic top view of a module 5 of a vehicle, only generally indicated, from which the steering wheel has been removed. In a stator 6, fixedly connected to the module 5 of a rotary connector, is an electrical line 7 extending in windings. The end 8 of the line 7 is, in accordance with known technology, connected to the functional elements of the keys 2 of the steering wheel 1. The other free end 9 of the line 7 ends in a coupling body 10 consisting of plastic material. This end of the line 7, or the electrical conductor present in the same, is connected to an electrical contact element 11 whose possible construction is indicated in FIGS. 4 and 5.

Also schematically illustrated lines 12 and 13, or their respectively indicated electrical conductors, are connected to electrical components which are arranged in the lever 3, on the one hand, and in the lever 4, on the other hand. The lines 12 and 13 have at least one insulated electrical conductor; but advantageously two or more conductors which are insulated relative to each other. The free ends of the lines 12 and 13 are also connected to an electrical contact element 11 located in the coupling body 10 which will again be explained with the aid of FIGS. 4 and 5.

FIG. 3 schematically shows a contact element 11 which has a plurality of electrical contacts 14 and 15 constructed as pins. In the illustrated embodiment, the electrical conductors 16 of a flat conductor web line 17 are electrically conductively connected to the contacts 14. The flat conductor web line may for example be the line 7 arranged in the stator 5 of the rotary connector.

In the illustrated embodiment, two electrical conductors constructed as round conductors 18 are electrically conductively connected to the contacts 14, which belong, for example, to the line 12 or to the line 13 according to FIG. 2. Contact elements 19 and 20 corresponding to the contact element 11 are, in accordance with FIGS. 4 and 5, mounted in such a way in the coupling body 10, composed of plastic material, that the ends of the respective contacts 14 or 15 are accessible from the outside on a plug-in side 21. They protrude on the plug-in side 21 out of the coupling body 10, so that a corresponding plug-in element 22 (FIG. 6) can be plugged in. The plug-in element 22 can be constructed independence on the shape of the contacts 14, 15 either as a bushing or as a plug.

The coupling body 10 is constructed in such a way that it can receive the most different types of lines corresponding to the contact elements 11, 19, 20. For example, the conductors of the flat conductor web line 17 are electrically connected to the contacts 14. For example, the contact element 20 is constructed in such a way that it facilitates the electrical connection of the round conductors 18 to the contacts 15 by means of a plate plug 23 to be pushed onto the conductor.

As already mentioned, the electrical conductors of the lines can preferably be equipped by way of prefabrication to the electrical contacts. The contacts, or contact elements, are then used in a prefabricated coupling body. However, it would also be possible to connect the electrical conductors to electrical contacts, which are already mounted in the coupling body.

In the mounted position, the coupling body 10 is fastened on or in the module 5 of a vehicle. For this purpose, it can be mounted, for example, at the stator 6 of the rotary connector. In accordance with FIG. 6, a plug-in element 22 is pushed onto the coupling body 10, which is arranged at the end of an electrical line 24. The line 24 has a number of contacts of the coupling body corresponding to the number of electrical conductors. It is connected with its free end to the onboard network of the vehicle.

The invention claimed is:

1. An arrangement comprising:
a steering wheel, with a rotary connector, wherein said rotary connector includes a stator, a rotor and a first electrical line positioned between said stator and said rotor, said rotary connector being mounted on the steering wheel,
at least two electrical components, at least one of which is mounted on the steering wheel,
said first electrical line of a first electrical component and a second electrical line connected to a second of said at least two electrical components are both connected with their free ends to electrical contacts which are arranged in at least one coupling body of insulation material in such a way that they are accessible for plugging an electrical plug-in element on a plug-in side of the coupling body,
the coupling body is mounted with the plug-in side accessible from the outside on the stator of the rotary connector,
on the coupling body, in the assembly position thereof, a single third electrical line leading to an onboard network of the vehicle is connected to said at least two electrical components through the plug-in element mounted to the third electrical line.

2. The arrangement according to claim 1, wherein the electrical conductors of the single lines are prefabricated with electrical contacts which are in the mounted state inserted in a prefabricated coupling body.

* * * * *